C. K. SALISBURY.
CARBURETER.
APPLICATION FILED OCT. 28, 1911.
1,129,428.
Patented Feb. 23, 1915.
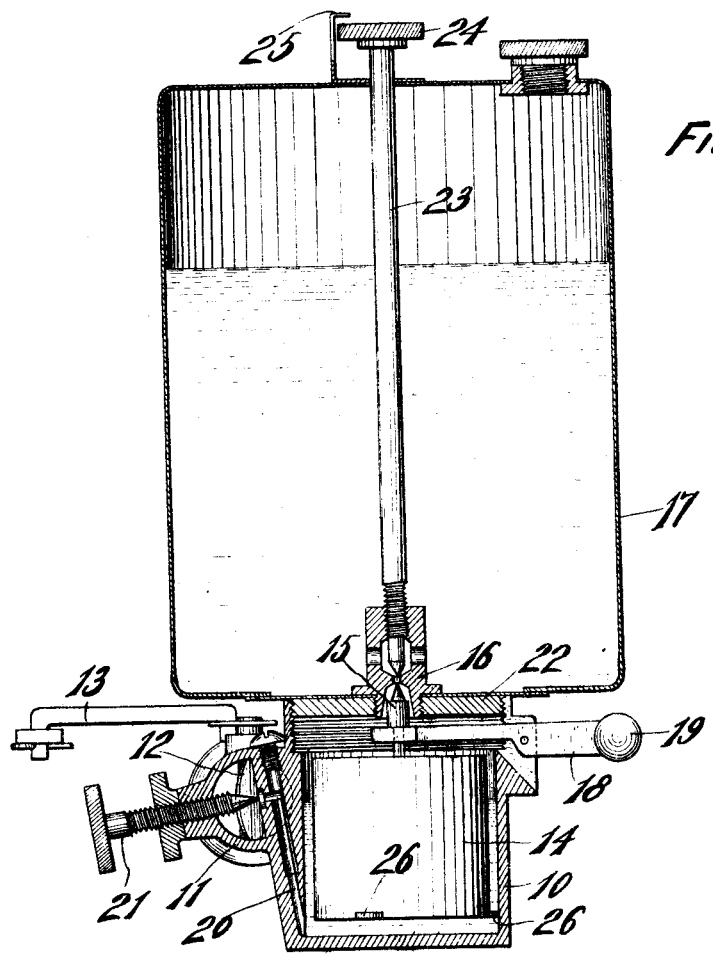
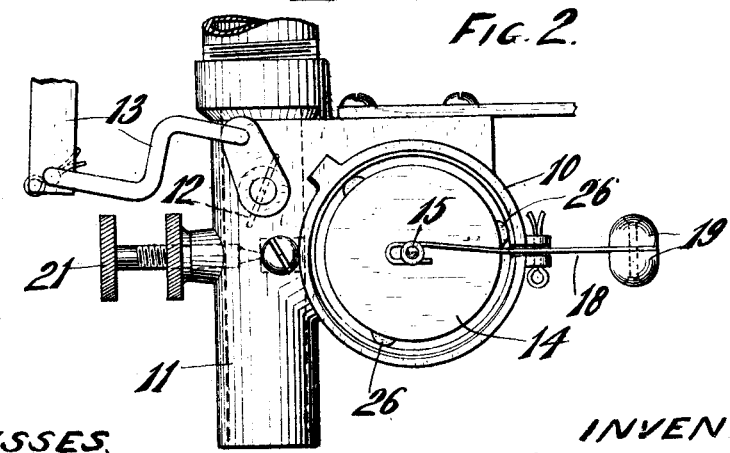
WITNESSES.
INVENTOR.
Charles K. Salisbury
By Morsell and Caldwell
ATTORNEYS.

UNITED STATES PATENT OFFICE.

CHARLES K. SALISBURY, OF MILWAUKEE, WISCONSIN, ASSIGNOR TO STANDARD SEPARATOR COMPANY, OF MILWAUKEE, WISCONSIN, A CORPORATION OF NEW JERSEY.

CARBURETER.

1,129,428.  Specification of Letters Patent.  Patented Feb. 23, 1915.

Application filed October 23, 1911. Serial No. 657,387.

*To all whom it may concern:*

Be it known that I, CHARLES K. SALISBURY, a citizen of the United States, and resident of Milwaukee, in the county of Milwaukee and State of Wisconsin, have invented new and useful Improvements in Carbureters, of which the following is a description, reference being had to the accompanying drawings, which are a part of this specification.

This invention has for its object to provide a carbureter particularly designed for an engine-driven centrifugal separator, but capable of general use.

An object of the invention is to provide a carbureter of minimum size by providing the float with a counterweight to assist it in closing the gasolene supply valve.

Another object of the invention is to provide a carbureter having a gasolene supply tank mounted thereon and directly communicating therewith but detachable and provided with a valve for closing the communication when it is to be detached.

Another object of the invention is to simplify the construction of a carbureter whereby it may be inexpensive to manufacture and durable and efficient in use.

With the above and other objects in view the invention consists in the carbureter as herein claimed and all equivalents.

Referring to the accompanying drawings in which like characters of reference indicate the same parts in the different views: Figure 1 is a sectional elevation of a carbureter constructed in accordance with this invention; and, Fig. 2 is a plan view thereof with the gasolene supply tank removed.

In these drawings 10 indicates a cup-shaped float chamber which is preferably formed integral with an intake pipe 11 for connection with the intake port of a gasolene engine or the like, 12 being an ordinary throttle valve in the intake pipe having a connection 13 with a governor or other controlling device not shown. A small float 14 is contained within the float chamber 10 and has a pointed stem 15 at its upper end which forms a needle valve for controlling the inflow of gasolene through a valve seat 16 in the bottom of a gasolene supply tank 17. Though the float may be of sufficient size to effect the control of the flow of gasolene into the float chamber without assistance, it is preferred to reduce the size of parts to a minimum and with this object in view the float may be provided with a counterweight to assist it in controlling the valve. The valve stem 15 is therefore provided with a reduced neck portion below its upper or head portion and a lever 18 which is pivotally mounted on the float chamber 10 and passing through a slot in the upper edge thereof has a hook-shaped inner end engaging the stem 15 at its reduced portion and also has a weight 19 on its outer end which serves to counterbalance the weight of the float and render it more sensitive to the influence of the change of gasolene level within the float chamber.

The float chamber has an inclined outlet duct 20 leading from the bottom thereof to the interior of the intake pipe 11 and its upper end which is slightly above the normal level of gasolene in the float chamber is controlled by a needle valve 21.

The valve seat 16 is contained within the gasolene supply tank 17 with a shoulder bearing on the bottom thereof and a threaded end projecting through the bottom of the tank, and a disk 22 is threaded on the projecting end of the valve seat and is preferably soldered to the bottom of the gasolene supply tank as well as to the threaded end of said valve seat. This disk 22 is threaded within the upper end of the float chamber 10 to constitute the supporting connection for the supply tank permitting it to be readily detached whenever desired.

A valve stem 23 is desirably provided with its lower end threaded in the upper portion of the valve seat 16 and forms a needle valve for closing the valve seat from above, said valve stem projecting through the upper end of the gasolene supply tank and provided with a head 24 by which it may be turned. A stop 25 is mounted on the gasolene supply tank to engage the head 24 and prevent its accidental removal.

In operation the gasolene is free to flow from the gasolene supply tank through the valve seat in the bottom thereof into the float chamber from which it may be drawn through the duct 20 by the suction from the engine in the intake pipe 11. The normal level of gasolene within the float chamber is maintained just below the level of the outlet of duct 20, so as not to overflow, by the float 14 rising with the assistance of the counterbalance 19 and checking the inflow of gasolene by closing the valve seat with the valve stem 15. By means of the counterbalance 19 a smaller float and consequently a smaller float chamber may be employed than would be necessary if the float alone were relied upon.

The gasolene supply reservoir being mounted directly on the float chamber is readily detachable for inspecting the parts, and a loss of gasolene through the valve seat at such times is prevented by closing said valve seat by means of the valve 28. The lever 18 being pivotally mounted by means of a cotter pin is readily removable when it is desired to remove the float.

The carbureter of this invention is extremely simple and inexpensive in its construction and durable and efficient in its operation.

What I claim as new and desire to secure by Letters Patent is,

A carbureter, comprising a float chamber having an outlet duct, a float contained within the float chamber, a valve member carried by the float, a gasolene supply tank detachably mounted on the float chamber, a valve seat in the bottom thereof through which gasolene is admitted to the float chamber, said valve seat being engaged by the valve member, and an independent needle valve carried by the detachable gasolene supply tank for closing the valve seat.

In testimony whereof, I affix my signature, in presence of two witnesses.

CHARLES K. SALISBURY

Witnesses:
 KATHERINE HOLT,
 R. S. C. CALDWELL.